United States Patent
Hamada

(10) Patent No.: US 10,453,006 B2
(45) Date of Patent: Oct. 22, 2019

(54) WORKFLOW GENERATION APPARATUS, WORKFLOW GENERATION METHOD, AND RECORDING MEDIUM

(71) Applicant: CANON KABUSHIKI KAISHA, Tokyo (JP)

(72) Inventor: Yoshinobu Hamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/995,752

(22) Filed: Jun. 1, 2018

(65) Prior Publication Data

US 2018/0374007 A1    Dec. 27, 2018

(30) Foreign Application Priority Data

Jun. 27, 2017    (JP) ................. 2017-125573

(51) Int. Cl.
  *H04N 1/04*    (2006.01)
  *G06Q 10/06*   (2012.01)
  *G06F 3/12*    (2006.01)

(52) U.S. Cl.
  CPC ........... *G06Q 10/06* (2013.01); *G06F 3/1204* (2013.01); *G06F 3/1275* (2013.01)

(58) Field of Classification Search
  CPC ...... G06Q 10/06; G06F 3/1275; G06F 3/1204

USPC ........................................ 358/1.15
  See application file for complete search history.

(56) References Cited

U.S. PATENT DOCUMENTS

| 6,624,908 | B1 * | 9/2003 | Petchenkine ......... G06Q 10/06 358/1.15 |
| 8,717,602 | B2 | 5/2014 | Hamada ..................... 358/1.15 |
| 9,215,347 | B2 | 12/2015 | Hamada |
| 2008/0144092 | A1 | 6/2008 | Kayama ..................... 35/1.15 |
| 2009/0164881 | A1 * | 6/2009 | Segarra ............... G06F 21/6245 715/230 |

FOREIGN PATENT DOCUMENTS

JP    2008-146606    6/2008

* cited by examiner

*Primary Examiner* — Houshang Safaipour
(74) *Attorney, Agent, or Firm* — Venable LLP

(57) ABSTRACT

A workflow generation apparatus which generates a workflow in which a plurality of processes are combined displays a screen for editing a workflow in which a plurality of processes are combined and incorporates a log recording process of recording data processed in the workflow as a log after or before a process satisfying a designated condition among the plurality of processes constituting the displayed workflow.

14 Claims, 17 Drawing Sheets

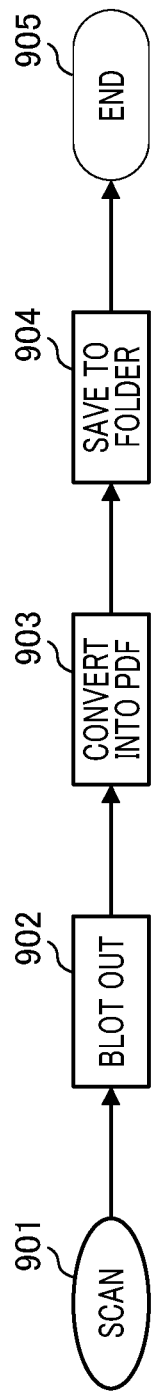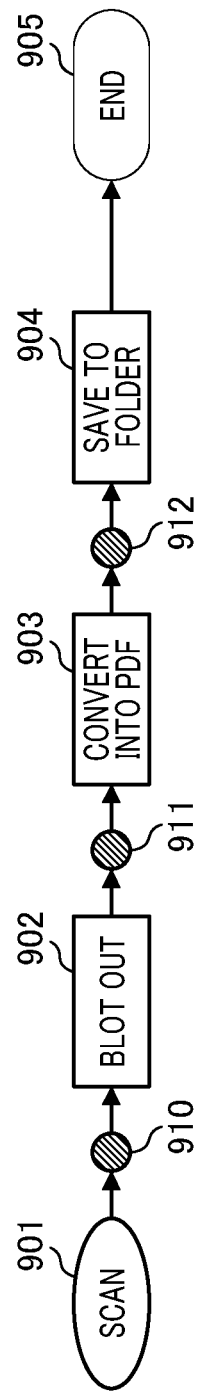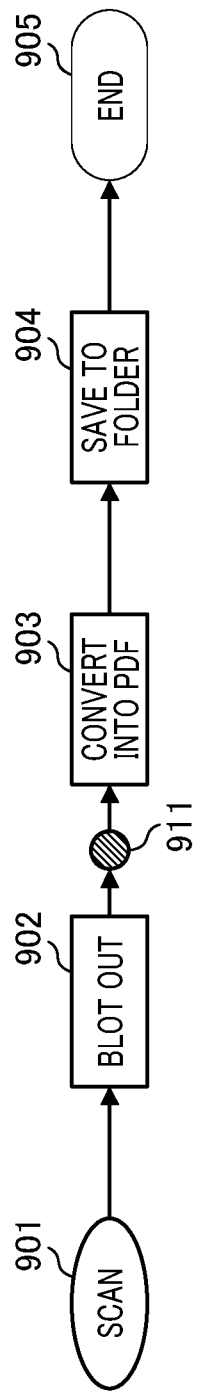

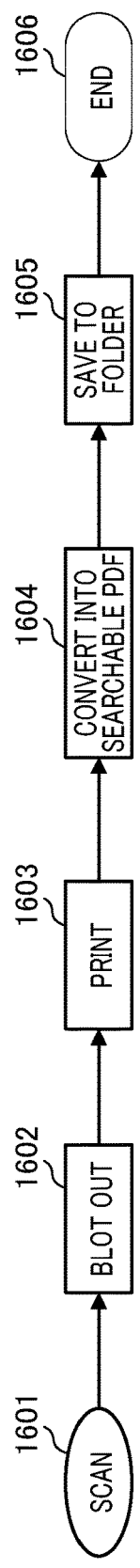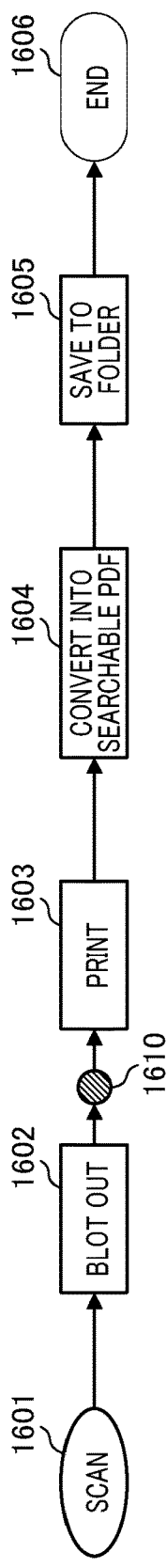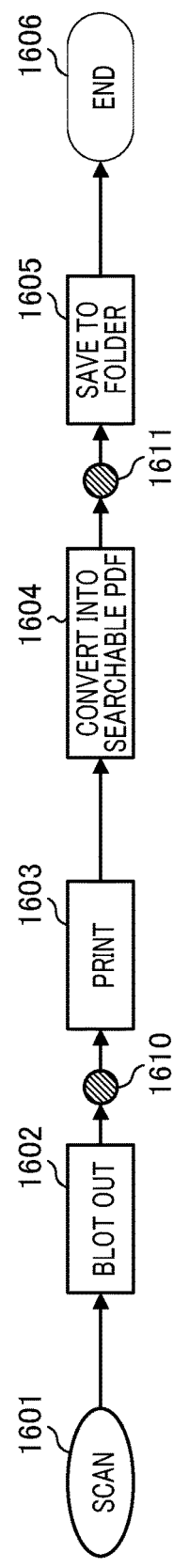

WORKFLOW GENERATION APPARATUS, WORKFLOW GENERATION METHOD, AND RECORDING MEDIUM

BACKGROUND OF THE INVENTION

Field of the Invention

The present invention relates to a workflow generation apparatus, a workflow generation method, and a recording medium.

Description of the Related Art

Conventionally, a process of recording history information on jobs such as printing together with image data is performed for the purpose of preventing information leakage and tracing an information leaker in an image forming apparatus such as a printer or a multi-function peripheral (MFP). In addition, there is a workflow system which creates and executes a workflow by combining a plurality of processes including a process of using the functions of an image forming apparatus. Since conditions for saving image data such as a data format that can be saved need to be taken into consideration for the designation of a timing of saving the image data, and a user is asked to designate a timing to save image data when a workflow is created, the burden on a user increases. Japanese Patent Laid-Open No. 2008-146606 discloses a technology for automatically recording image data which can be used again in a workflow in preparation for a workflow being repeatedly executed.

However, in Japanese Patent Laid-Open No. 2008-146606, since image data is saved at a fixed timing during execution of a workflow, there is a problem that the number of times image data is saved may increase and a capacity for saving image data may also increase.

SUMMARY OF THE INVENTION

The present invention provides a workflow generation apparatus which reduces the burden on a user who creates a workflow including a process of recording image data.

The workflow generation apparatus of the present invention displays a screen for editing a workflow in which a plurality of processes are combined, and incorporates a log recording process of recording data processed in the workflow as a log after or before a process satisfying a designated condition among the plurality of processes constituting the displayed workflow.

Further features of the present invention will become apparent from the following description of exemplary embodiments with reference to the attached drawings.

BRIEF DESCRIPTION OF THE DRAWINGS

FIGS. 9A to 9C are diagrams which show examples of workflow.

FIGS. 16A to 16C are diagrams which show examples of workflow.

DESCRIPTION OF THE EMBODIMENTS (Embodiment 1)

Figure 1:
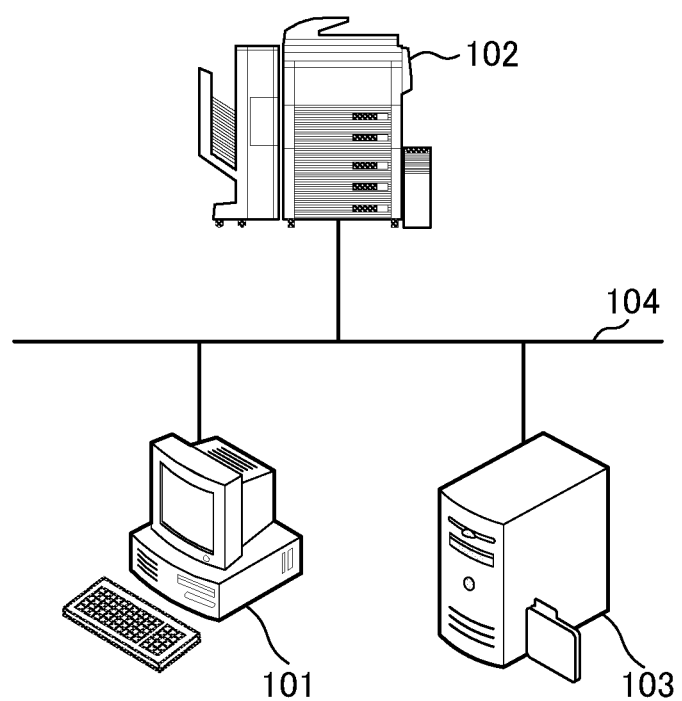
FIG. 1 is a diagram which shows a configuration example of a workflow system.

FIG. 1 is a diagram which shows a configuration example of a workflow system. The system includes an information processing apparatus 101, an image forming apparatus 102, and a file server 103. The information processing apparatus 101 is a personal computer (PC) which executes a workflow editor for generating a workflow. That is, the information processing apparatus 101 functions as a workflow generation apparatus which generates a workflow. The image forming apparatus 102 is an MFP which executes a workflow generated by the information processing apparatus 101. The file server 103 is a file server for storing and sharing files and the like generated by the workflow. The information processing apparatus 101, the image forming apparatus 102, and the file server 103 are connected to each other by a network 104. The network 104 may be a local area network (LAN) or the Internet which constitutes a cloud environment.

Figure 2:
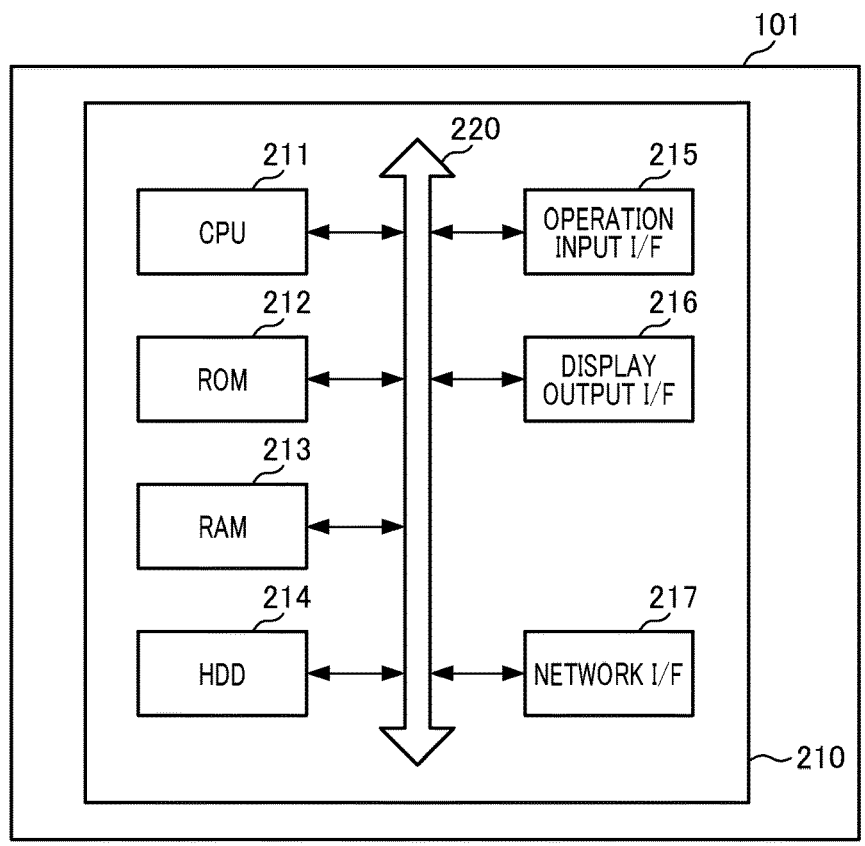
FIG. 2 is a diagram which shows a hardware configuration example of an information processing apparatus.

FIG. 2 is a diagram which shows a configuration example of hardware of the information processing apparatus 101. A control unit 210 of the information processing apparatus 101 includes a CPU 211, a ROM 212, a RAM 213, an HDD 214, an operation input I/F 215, a display output I/F 216, and a network I/F 217. The control unit 210 controls an overall operation of the information processing apparatus 101. The CPU 211 loads a program stored in the ROM 212 or the HDD 214 onto the RAM 213, and executes control processes and calculation processes of various types. The ROM 212 stores various types of programs. The RAM 213 is a work memory for the CPU 211 executing various types of programs. In addition, the RAM 213 is a temporary storage area which temporarily stores various types of data. The HDD 214 stores various types of programs such as a workflow editor, created workflows, and the like.

The operation input I/F 215 receives a signal input from an operation device such as a keyboard or a mouse connected thereto. The display output I/F 216 performs a signal output to a display device such as a display. The network I/F 217 connects the control unit 210 to the network 104, and transmits or receives information to or from other devices on the network 104. Respective configuration units in the control unit 210 (the CPU 211 to the network I/F 217) are connected by a bus 220.

Figure 3:
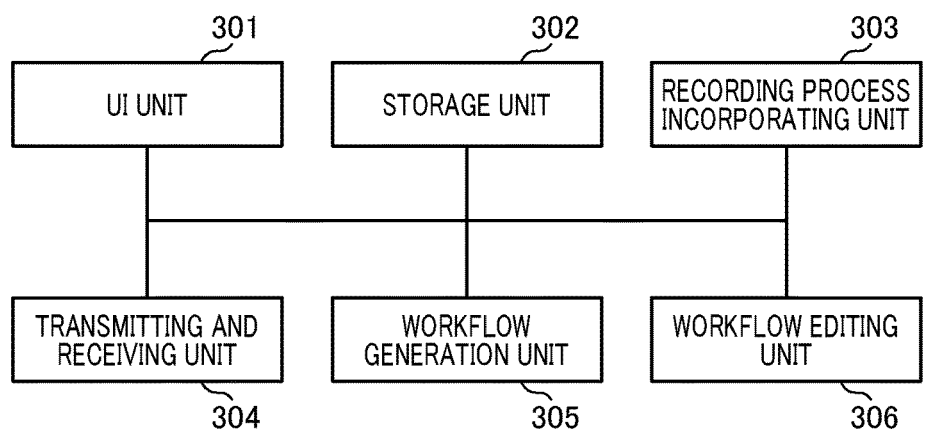
FIG. 3 is a diagram which shows a software configuration example of a workflow generation apparatus.

FIG. 3 is a diagram which shows a software configuration example of a workflow generation apparatus. That is, FIG. 3 is a diagram which shows a software configuration example of a workflow editor of the information processing apparatus 101. The workflow generation apparatus in the present embodiment includes an UI unit 301, a storage unit 302, a recording process incorporating unit (hereinafter, referred to as an incorporating unit) 303 and a transmitting and receiving unit 304. The UI unit 301 displays a screen for creating or editing a workflow, and provides a user interface for receiving an input operation from a user (a workflow creator). The storage unit 302 stores a created workflow in the HDD 214 in the information processing apparatus 101. The storage unit 302 further stores information (definitions) on each process (part) of a workflow. The incorporating unit 303 analyzes the workflow and determines a position for insertion of a log image recording part. The transmitting and receiving unit 304 acquires a workflow stored by the storage unit 302 and transmits the workflow to the image forming apparatus 102. In addition, the transmitting and receiving unit 304 receives the workflow from the image forming apparatus 102 and saves it in the storage unit 302. Moreover, the workflow generation apparatus further includes a workflow generation unit 305 and a workflow editing unit 306. In the present embodiment, an example in which a workflow editor is included in the information processing apparatus 101 is described, but the image forming apparatus 102 may include a workflow editor. At this time, the image forming apparatus 102 functions as a workflow generation apparatus.

Figure 4:
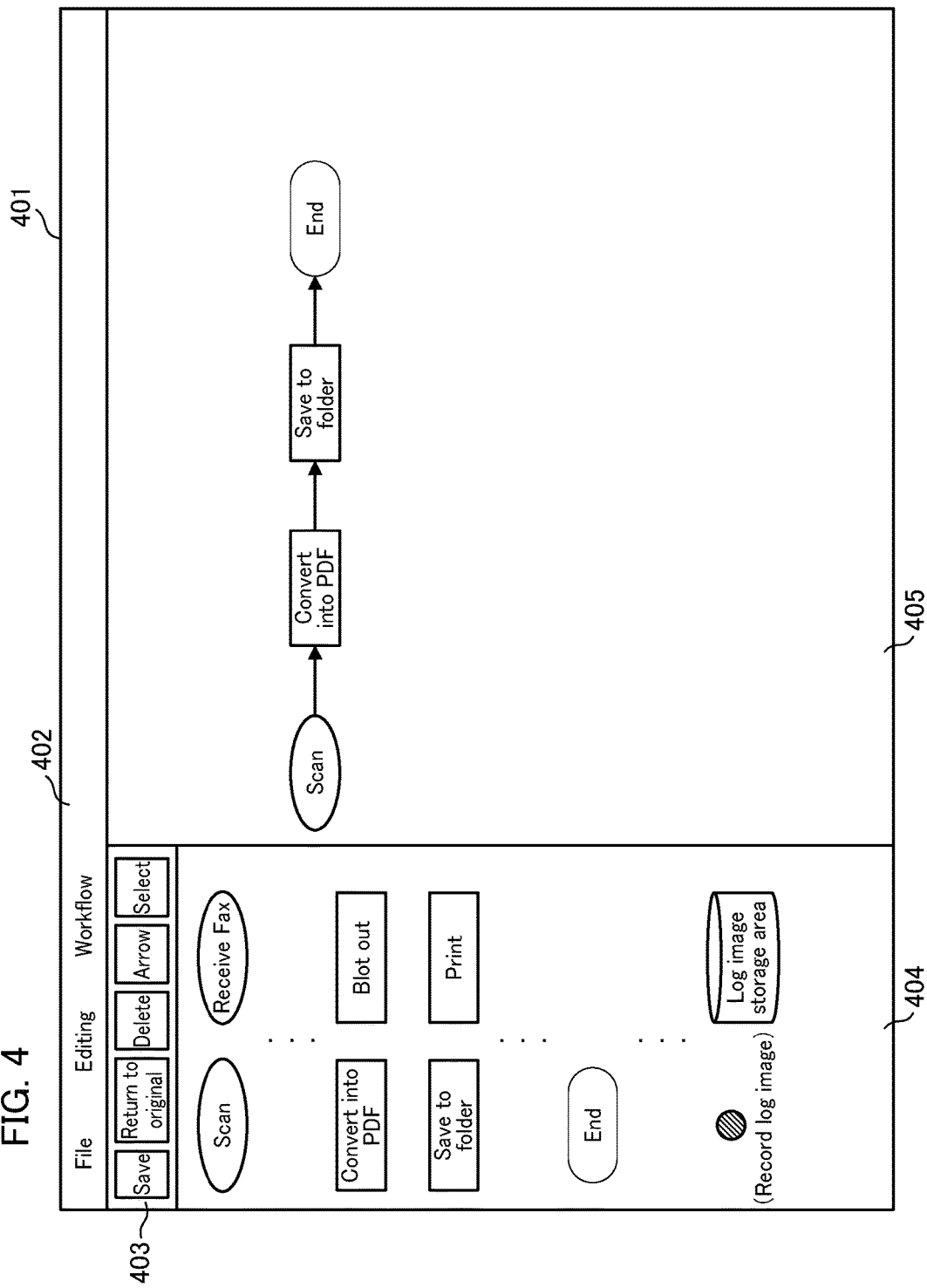
FIG. 4 is a diagram which shows an example of the screen of a workflow editor.

FIG. 4 is a diagram which shows an example of the screen of a workflow editor. A window 401 is a window for displaying a user interface of the workflow editor. A menu 402 is a menu area for displaying menus for executing each function of the workflow editor. Menus such as "file," "edit," and "workflow" are displayed in the menu 402. A shortcut 403 is a shortcut button display area for making it easy to select some functions in the menu. Shortcut buttons such as "save," "delete," and "arrow" are displayed in the shortcut 403. The part selection area 404 is a workflow part selection area in which parts corresponding to a plurality of functions (a plurality of process contents) available for a workflow are displayed in an icon format. Parts corresponding to each of a plurality of processes such as "scan," "convert into PDF," "save to folder," "print," "end," and "record log image" are displayed in the part selection area 404. The editing area 405 is a workflow editing area for creating or editing a workflow by disposing parts desired by a user and connecting each of the parts on the basis of an instruction of a user. If a workflow created in the editing area 405 is executed, a process corresponding to each part is executed in order according to a connection order of respective parts of the created workflow. As an example, a workflow having a series of processes for converting a scanned image into a PDF and saving it to a folder is displayed in the editing area 405 of FIG. 4.

In creating or editing a workflow, a user selects any part from the part selection area 404 and drags it to dispose workflow parts in the editing area 405. Then, a flow is defined by connecting disposed parts using arrows. Connection by arrows may be performed manually by dragging a mouse, for example, after an arrow button of the shortcut 403 is pressed, or may be performed automatically by a workflow editor's determination and connection when disposing the parts.

In the present embodiment, an example of information (definitions) on each part is shown in Table 1.

TABLE 1

| Part Name | Part type | Input | Input details | Output | Output details | Editing | External output |
|---|---|---|---|---|---|---|---|
| Scan | Start | — | | Image | JPEG | No | No |
| Receive FAX | Start | — | | Image | TIFF | No | No |
| Convert into PDF | Process | Image | JPEG, TIFF, BMP | Image | PDF | No | No |
| Convert into searchable PDF | Process | Image | JPEG, TIFF, BMP | Image | Searchable PDF | No | No |
| Save to folder | Process | * | | * | * | No | Yes |
| Blot out | Process | Image | JPEG, TIFF, BMP | Image | * | Yes | No |
| Seal | Process | Image | JPEG, TIFF, BMP | Image | * | Yes | No |
| OCR | Process | Image | JPEG, TIFF, BMP | Text | TEXT | No | No |
| Read QR code | Process | Image | JPEG, TIFF, BMP | Text | TEXT | No | No |
| Print | Process | * | | * | | No | Yes |
| End | End | — | | — | | No | No |
| Record log image | Record log image | Image | JPEG, TIFF, BMP | Image | | No | No |

Each part has information (definitions) of a part name, a part type, an input, input details, an output, output details, editing, and external output. The part name is the name of a part. The part type represents a type of each part, "start" represents a part which is a starting point of a workflow, "end" represents a part which is disposed at the end of a workflow, and "process" represents a part which can be disposed between a starting part and an end part, respectively.

Input shows a type of data that is input to a part. "Image" represents that image data is received as an input, and "*" represents that various files including images are received as an input. Input details represent a file format of data, such as JPEG or PDF. Output shows a type of data at the time of being output by a part. "Image" represents that image data is output, and "*" represents an output by type in accordance with a type of data which is input to a next part. Output details represent a file format of data to be output. If an output detail is "*," this represents an output in the same file format as an input file format.

Editing represents whether the content of an image is edited by the process of a part, that is, the presence or absence of editing. Editing herein refers to a direct drawing process for an image, such as blotting out a predetermined area or adding characters, and does not include a process which does not directly change the content of an image, such as resolution conversion or file format conversion. External output represents whether an image which is included in an input is output outside of an apparatus on which a workflow is being executed (the image forming apparatus 102 in the present embodiment), that is, the presence or absence of an external output. For example, since an image is printed on paper and output in a case of print, the external output is "yes." Moreover, since an image file is saved in an external device such as the file server 103, in a case of save to folder, the external output is "yes." External output is not limited to save and print shown in Table 1, and includes all cases in which an image is output from the image forming apparatus 102 such as a case in which an image is output to perform a process in a cloud.

Figure 5:
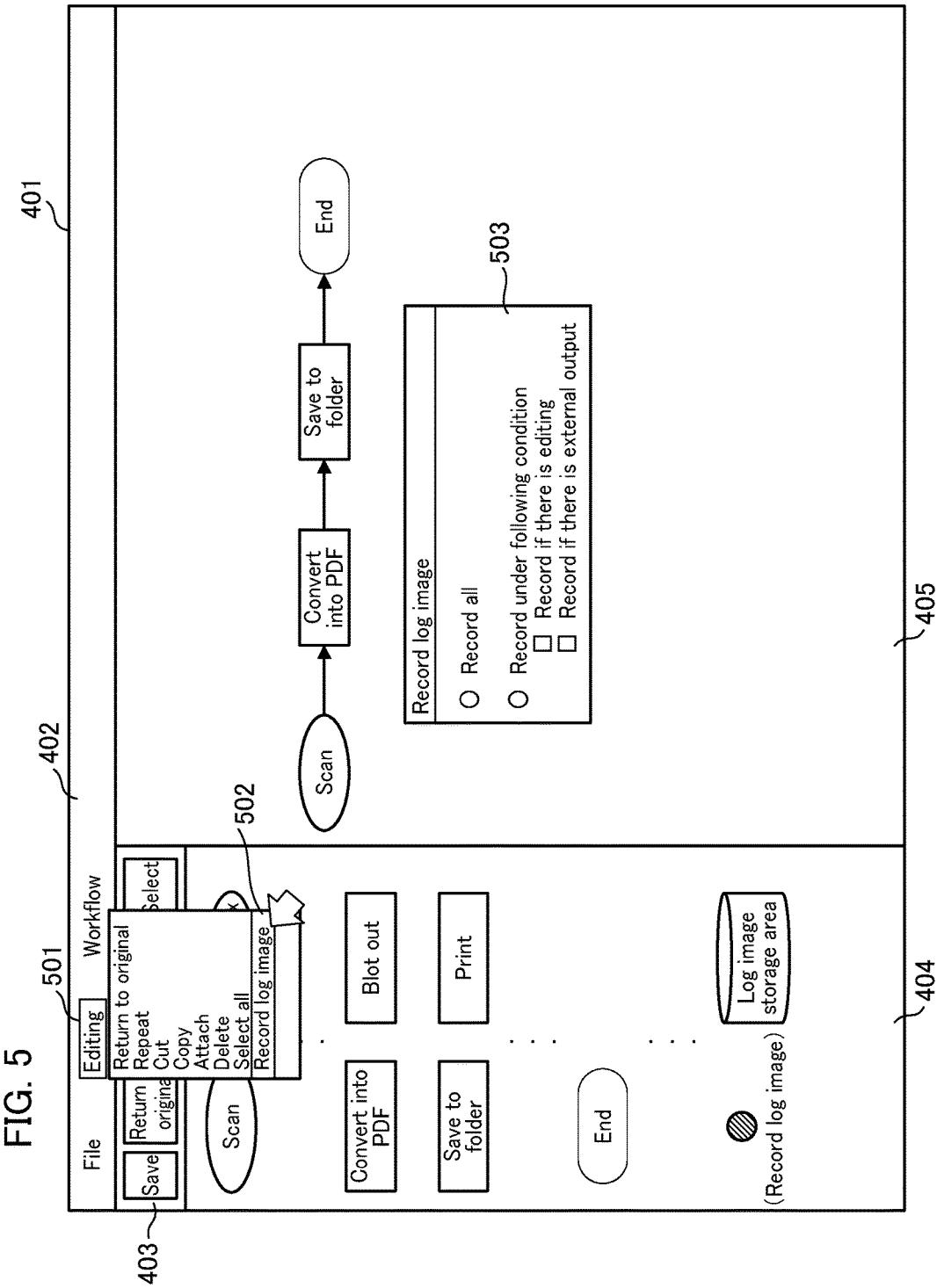
FIG. 5 is a diagram which shows an example of the screen of a workflow editor.

Next, an operation for incorporating a part for recording a log image (hereinafter, referred to as a log image recording part) in a workflow will be described using FIG. 5. The log image recording part records only image data as a log image. FIG. 5 is a diagram which shows an example of the screen of a workflow editor when log image recording is instructed. An edit button 501 is one of menus displayed in the menu 402, and edit menu items representing various types of edit functions are displayed by pressing the edit button 501. A log image recording menu 502 is one of the edit functions displayed when the edit button 501 is pressed, and a process of incorporating a part for recording a log image in a workflow is executed by pressing the log image recording menu 502. A dialog box 503 is a dialog box for selecting a condition for determining the insertion position of a log image recording part.

If a user wants to insert a process of recording a log image in the created workflow, the user presses the edit button 501, and selects the log image recording menu 502. If the log image recording menu 502 is selected, the UI unit 301 of a workflow editor displays the dialog box 503 for selecting a condition for determining an insertion position of a log image recording part. Instead of selecting the log image recording menu 502, the dialog box 503 may also be displayed by dragging a log image storage area part from the part selection area 404 to the editing area 405 using a mouse.

A user can cause the incorporating unit 303 to execute a process of incorporating a log image recording part in a workflow by selecting a condition for recording a log image from among a plurality of conditions presented in the displayed dialog box 503. A workflow in which a log image recording part is incorporated is displayed in the editing area 405 by the UI unit 301. A user can check a position at which a log image recording part is incorporated in the editing area 405, and can add and delete the log image recording part or change the position when necessary. For example, a log image recording part may be added in preparation for abnormal termination of a workflow in the middle thereof, and the like, and the number of log image recording parts may also be reduced to save storage capacity for recording a log image.

A plurality of conditions for determining the insertion position of a log image recording part are presented in the dialog box 503. The conditions for determining the insertion position of a log image recording part displayed in the dialog box 503 include, for example, "record all," "record if there is editing," and "record if there is an external output." The conditions such as "record if there is editing" and "record if there is an external output" can be selected together. In each condition, how the incorporating unit 303 determines the insertion position of a log image recording part will be described using FIGS. 6 to 13D. In the present embodiment, a log image recording condition to be applied may be set in advance such that a user is not conscious of the log image recording condition and a recording timing. Furthermore, a log image recording part may be set not to be displayed.

Figure 6:
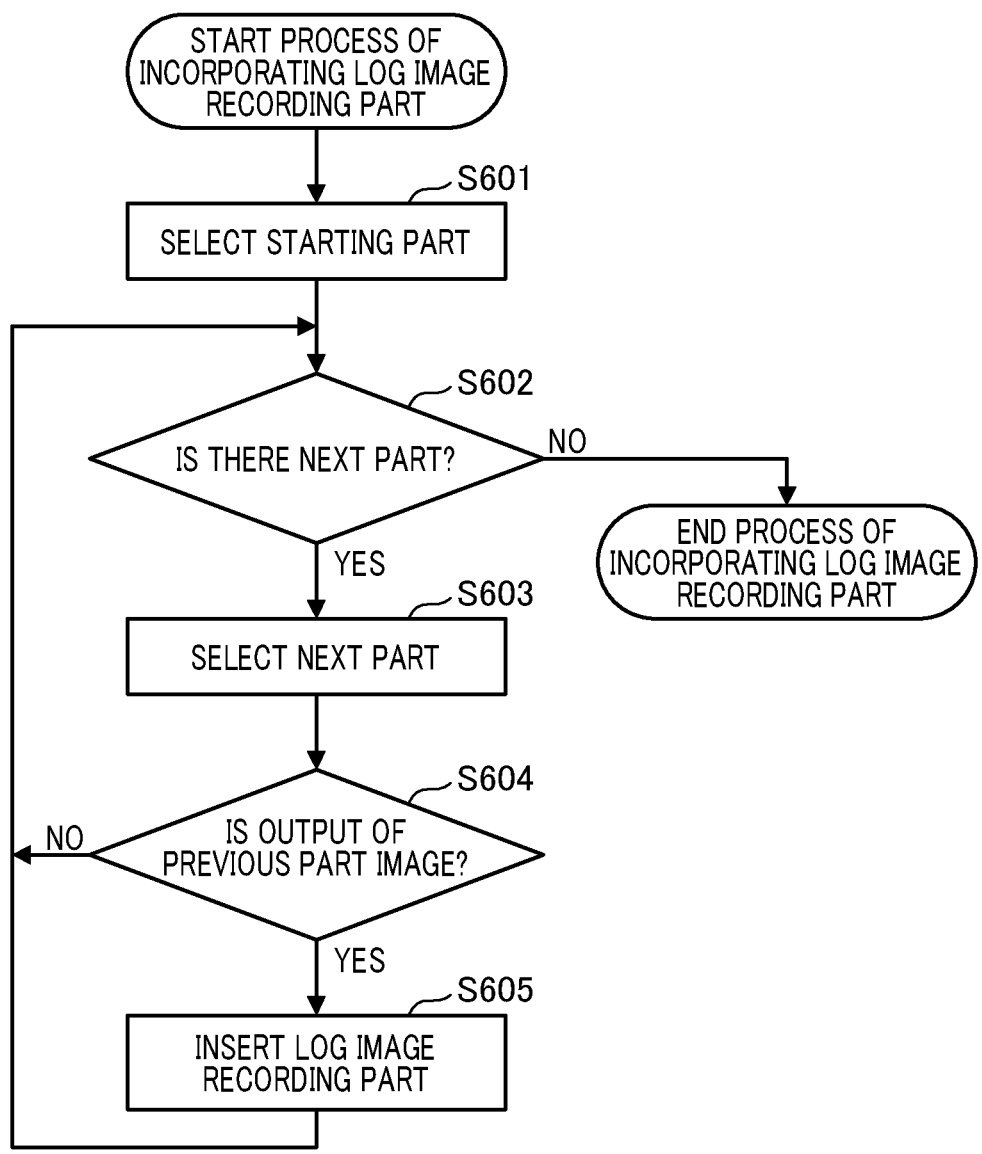
FIG. 6 is a flowchart which shows a process of incorporating a log image recording part when "record all" is designated.

FIG. 6 is a flowchart of the process of incorporating a log image recording part if "record all" is designated as a condition for recording a log image. Each step shown in the flowchart of FIG. 6 is stored in the ROM 212 or the HDD 214 of the information processing apparatus 101, and executed by the CPU 211. In addition, the CPU 211 uses the RAM 213 or the HDD 214 as a storage area when necessary.

In step S601, the incorporating unit 303 selects a starting part from a workflow to incorporate a log image recording part therein.

In step S602, the incorporating unit 303 determines whether there is a part after the selected part (that is, a next process). If there is a next part, the process proceeds to step S603. If there is no next part, the process ends.

In step S603, the incorporating unit 303 selects the part after the selected part.

In step S604, the incorporating unit 303 determines whether an output of a part previous to the selected part is an image. If an output of the previous part is an image, the process proceeds to step S605. If an output of the previous part is not an image, the process returns to step S602.

In step S605, the incorporating unit 303 inserts a log image recording part between the selected part and the part previous thereto, and the process returns to step S602.

Figure 7A:
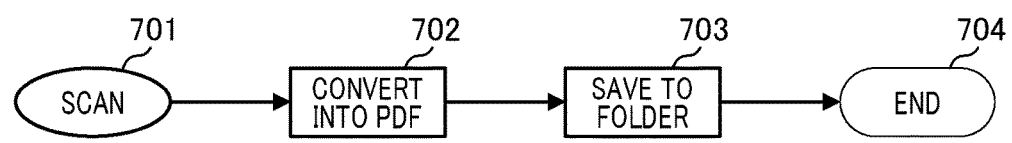
FIGS. 7A and 7B are diagrams which show examples of workflow.
Figure 7B:
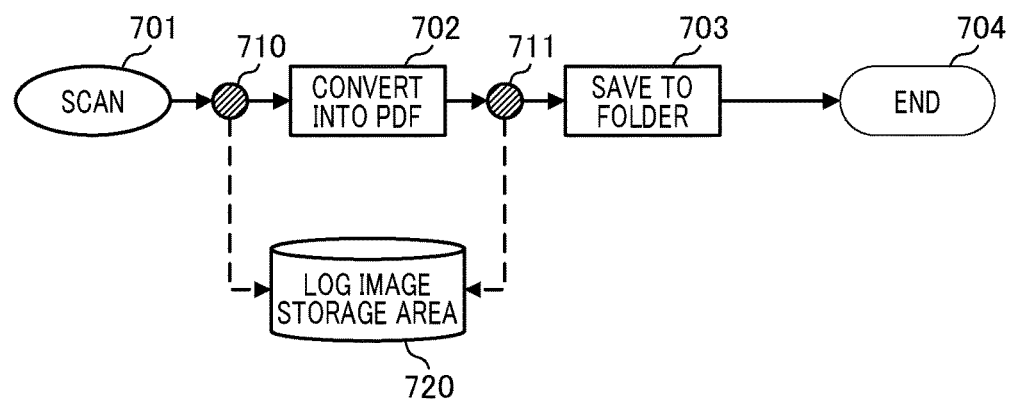

Using FIGS. 7A and 7B, a process in a case of "record all" being designated as a condition for recording a log image, that is, a process based on the flowchart of FIG. 6, will be described in detail. FIG. 7A is a diagram which shows an example of a workflow before a log image recording part being inserted, and FIG. 7B is a diagram which shows an example of a workflow after a log image recording part being inserted.

The workflow shown in FIG. 7A is a workflow to incorporate a log image recording part therein. Parts 701 to 704 are parts of a workflow, and the process is performed in order from the part 701. The workflow shown in FIG. 7B is a workflow after a log image recording part being incorporated. A log image recording part 710 and a log image recording part 711 are incorporated in the workflow. In addition, a log image storage area part 720 is a part which shows an area for storing a log image. In the present embodiment, the log image storage area part 720 is displayed on a screen by the UI unit 301 together with a dotted arrow from a log image recording part when a workflow incorporating the log image recording part is displayed.

The process of incorporating a log image recording part in the workflow shown in FIG. 7A will be described according to the flowchart of FIG. 6.

In step S601, the incorporating unit 303 selects a "scan" part 701 which is a first part of the workflow. In step S602, the incorporating unit 303 determines whether there is a part after the selected part 701. Since there is a "convert into PDF" part 702 as a part after the part 701, the process proceeds to step S603. Then, the incorporating unit 303 selects the "convert into PDF" part 702 in step S603.

In step S604, the incorporating unit 303 determines whether an output of the part 701 which is a part previous to the selected part 702 is an image. Since the output of the "scan" part 701 is an image, the process proceeds to step S605. Then, in step S605, the incorporating unit 303 inserts the log image recording part 710 between the selected part 702 and the part 701 previous thereto. Thereafter, the process returns to step S602 to repeat the same process.

The incorporating unit 303 inserts the log image recording part 711 between the part 702 and a part 703 because the output of the "convert into PDF" part 702 is an image.

On the other hand, an output of the "save to folder" part 703 is "*." Therefore, the part 703 performs an output by type in accordance with a type of input data of a next part, but since an input of the "end" part 704 which is a next part is "none", the part 703 does not output anything. Since an output of the "save to folder" part 703 is not an image, the incorporating unit 303 does not insert a log image recording part between the part 703 and the part 704.

The UI unit 301 displays a log image storage area part 720 together with a dotted arrow from the log image recording part 710 and the log image recording part 711 when a workflow incorporating the log image recording part 710 and the log image recording part 711 is displayed. This is to explicitly indicate a storage location of data recorded by a log image recording part. In a specific example of a workflow hereafter, illustration and description of a log image storage area part will be omitted.

Figure 8:
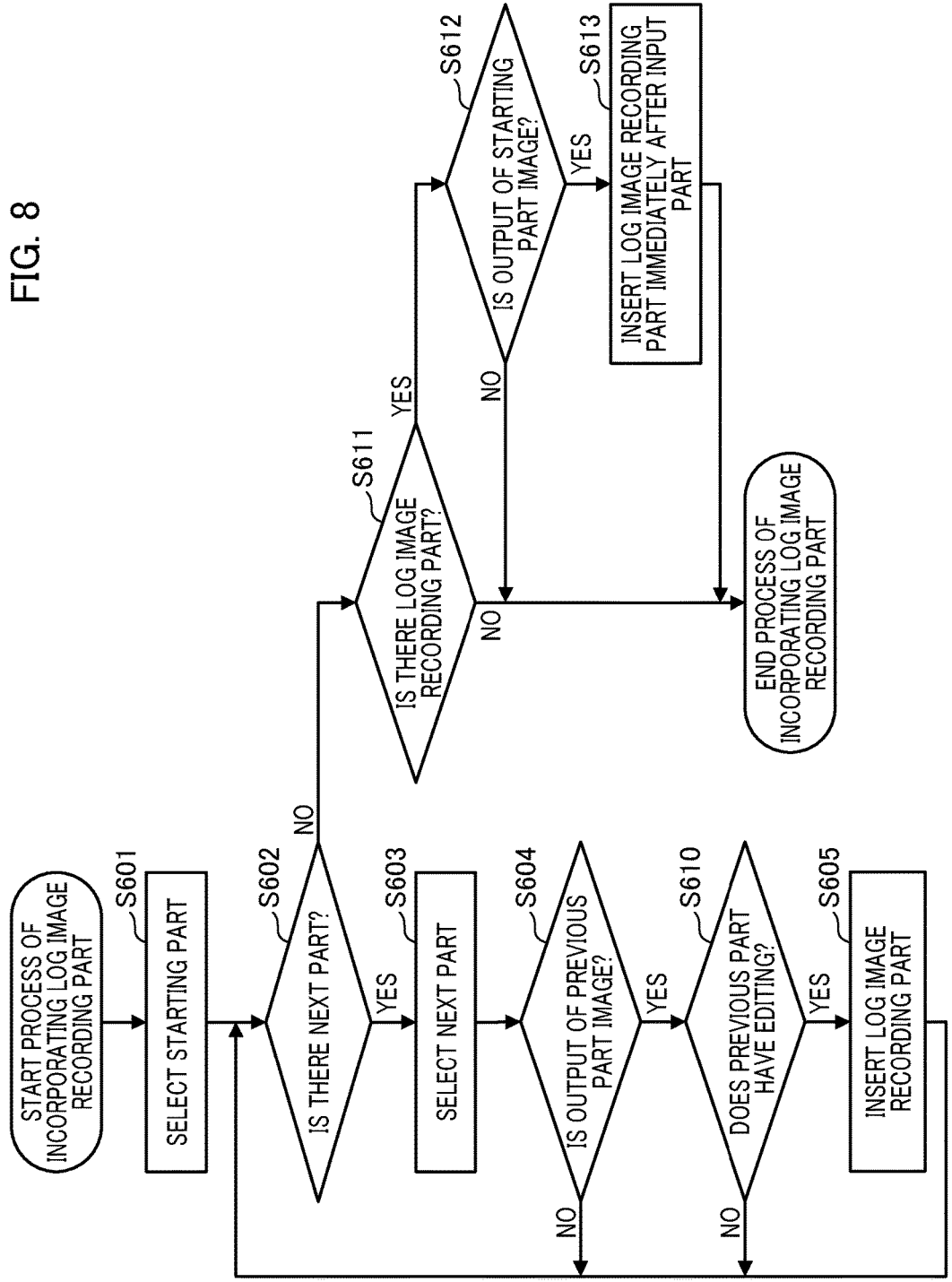
FIG. 8 is a flowchart which shows the process of incorporating a log image recording part when "record if there is editing" is designated.

FIG. 8 is a flowchart of the process of incorporating a log image recording part when "record in a case of editing" is designated as a condition for recording a log image. Each step shown in the flowchart of FIG. 8 is stored in the ROM 212 or the HDD 214 of the information processing apparatus 101, and executed by the CPU 211. In addition, the CPU 211 uses the RAM 213 or the HDD 214 as a storage area when necessary. Steps the same as in FIG. 6 are denoted by the same reference numerals as in FIG. 6 and the description thereof will be omitted. Only steps S610 to S612 will be described.

In step S610, the incorporating unit 303 determines whether a part previous to the selected part is a part on which an editing process is performed, that is, a part with editing. If it is a part with editing, the process proceeds to step S605, and the incorporating unit 303 inserts a log image recording part between the selected part and a part previous thereto. If it is a part without editing, the process returns to step S602.

In step S611, the incorporating unit 303 determines whether there is a log image recording part in a workflow to incorporate a log image recording process therein. If there is no log image recording part, the process proceeds to step S612. On the other hand, if there is a log image recording part, the process ends.

In step S612, the incorporating unit 303 determines whether an output of a starting part is an image. If an output of a starting part is an image, the process proceeds to step S613. On the other hand, if an output of a starting part is not an image, the process ends.

In step S613, the incorporating unit 303 inserts a log image recording part immediately after the starting part, and ends the process. Steps S611 to S613 are a process for recording an image log if a workflow is constituted by only parts without editing. With this process, if a workflow is constituted by only parts without editing even if an image is input to the workflow, it is possible to prevent an image log from not being recorded without any log image recording part being inserted.

A process in a case of "record if there is editing" being designated as a condition for recording a log image, that is, a process based on the flowchart of FIG. 8, will be described in detail with reference to FIGS. 9A to 9C. FIG. 9A is a diagram which shows an example of a workflow before a log image recording part is inserted. FIG. 9B is a diagram which shows an example of a workflow after a log image recording part is inserted under a condition of "record all." FIG. 9C is a diagram which shows an example of a workflow after a log image recording part is inserted under a condition of "record if there is editing."

The workflow shown in FIG. 9A is a workflow to incorporate a log image recording part therein. Parts 901 to 905 are workflow parts and the process is performed in order from the part 901. If "record all" is designated as a condition for recording a log image, log image recording parts 910 to 912 are inserted as shown in FIG. 9B in accordance with the flowchart of FIG. 6. However, log images recorded by the log image recording parts 911 and 912 are different only in file format, but the drawing contents themselves are the same. For this reason, the need to record both images before and after PDF conversion (part 903) as log images is low.

On the other hand, if "record if there is editing" is designated as a condition for recording a log image, only the log image recording part 911 is inserted as shown in FIG. 9C in accordance with the flowchart of FIG. 8. This is because editing is "yes" only for the "blot out" part 902 among the parts 901 to 905. The incorporating unit 303, in step S610, proceeds to S905 only if a previous part is the part 902, and inserts the log image recording part 911 between the part 902 and the part 903. As a result, if there is no editing for drawing contents, it is possible to prevent a log image from being redundantly recorded, and to reduce a log image recording capacity.

Figure 10:
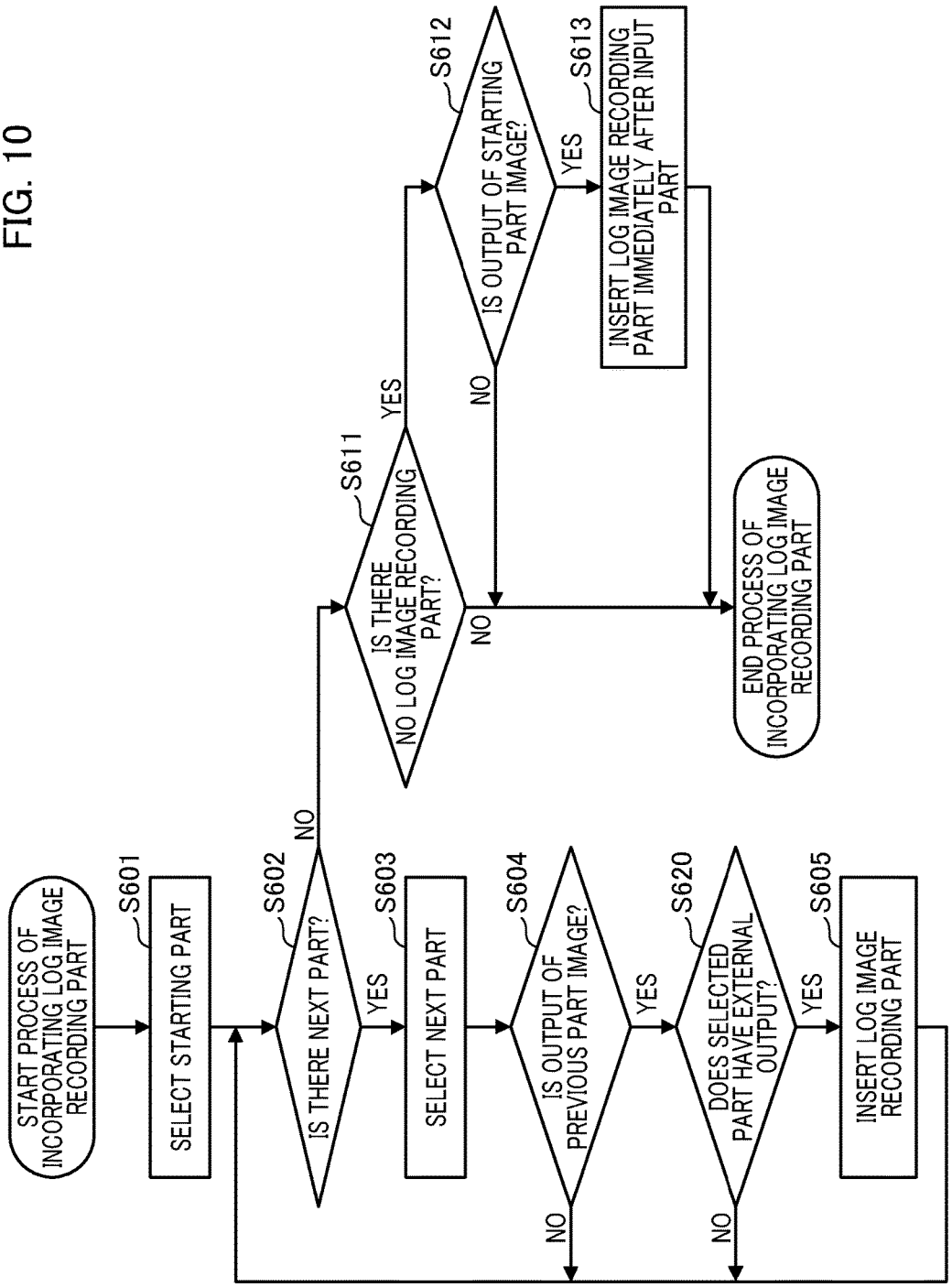
FIG. 10 is a flowchart which shows the process of incorporating a log image recording part when "record if there is an external output" is designated.

FIG. 10 is a flowchart of the process of incorporating a log image recording part if "record if there is an external output" is designated as a condition for recording a log image. Each step shown in the flowchart of FIG. 10 is stored in the ROM 212 or the HDD 214 of the information processing apparatus 101, and executed by the CPU 211. In addition, the CPU 211 uses the RAM 213 or the HDD 214 as a storage area when necessary. Steps the same as in FIG. 8 are denoted by the same reference numerals as in FIG. 8, and the description thereof will be omitted. Only step S620 will be described.

In step S620, the incorporating unit 303 determines whether a selected part is a part with an external output. If a selected part is a part with an external output, the process proceeds to step S605, and the incorporating unit 303 inserts a log image recording part between the selected part and a part previous thereto. On the other hand, if a selected part is a part without an external output, the process returns to step S602. In step S605, a log image recording part is caused to be inserted before the selected part with an external output, but a log image recording part may also be inserted after the part with an external output such that a log image is recorded after an external output process is completed.

Steps S611 to S613 are a process for recording an image log if a workflow is constituted by only parts without an external output. With this process, if a workflow is constituted by only parts without an external output even though an image is input to the workflow, it is possible to prevent an image log from not being recorded without any log image recording part being inserted.

Figure 11A:
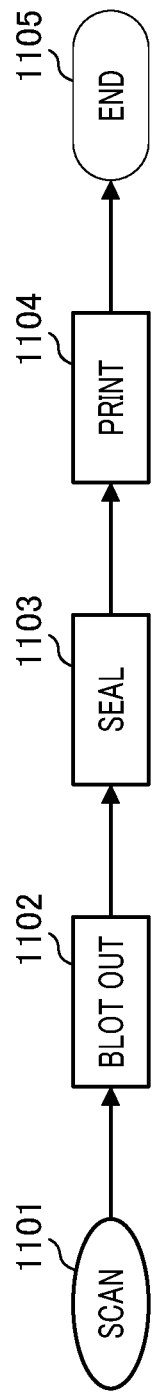
FIGS. 11A to 11C are diagrams which show examples of workflow.
Figure 11B:
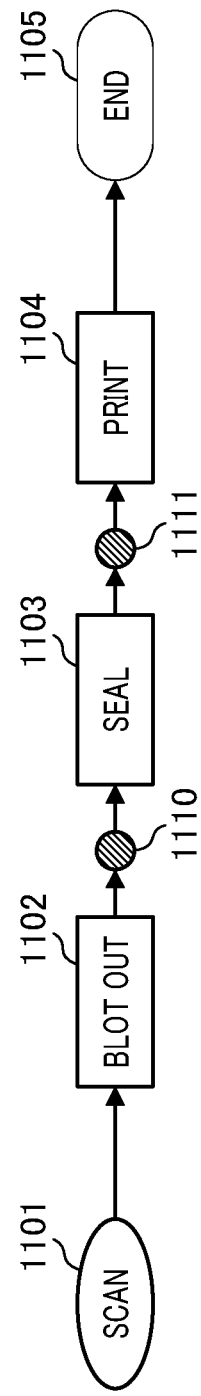
Figure 11C:
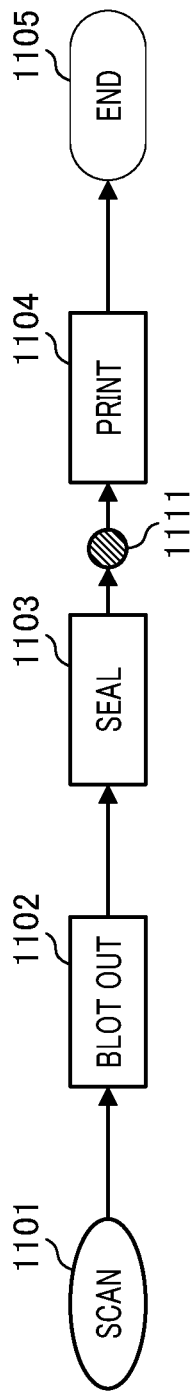

Using FIGS. 11A to 11C, a process in a case of "record if there is an external output" being designated as a condition for recording a log image, that is, a process based on the flowchart of FIG. 10, will be described in detail. FIG. 11A is a diagram which shows an example of the workflow before a log image recording part is inserted. FIG. 11B is a diagram which shows an example of the workflow after a log image recording part is inserted under a condition of "record if there is editing." FIG. 11C is a diagram which shows an example of the workflow after a log image recording part is inserted under a condition of "record if there is an external output."

The workflow shown in FIG. 11A is a workflow to incorporate a log image recording part therein. Parts 1101 to 1105 are workflow parts, and a process is performed thereon from the part 1101. Among the parts 1101 to 1105, a part with editing is a "blot out" part 1102 and a "seal" part 1103, and a part with an external output is a "print" part 1104.

If "record if there is editing" is designated as a condition for recording a log image, a log image recording part 1110 and a log image recording part 1111 are inserted in accordance with the flowchart of FIG. 8. However, a log image recorded by the log image recording part 1110 is an image in the middle of editing which is further edited by the subsequent part 1103, and may also not be output to the outside from the image forming apparatus 102. An image in the middle of editing which is not accompanied by an external output has a low risk of information leakage and has a low need to be recorded as a log image. Therefore, it is possible to designate conditions such that an image is recorded only if it is considered that the image has been completely edited and output to the outside.

If a condition of "record if there is an external output" is designated, the process proceeds to step S605 and a log image recording part is inserted only in a case of a selected part being determined to be a part with an external output in step S620 in accordance with the flowchart of FIG. 10. The log image recording part 1111 is inserted between the "print" part 1104 which is a part with an external output and the "seal" part 1103 in a workflow shown in FIG. 11C. As a result, an image can be recorded as a log image only when there is an external output. In addition, it is possible to reduce a log image recording capacity and to reduce the load of the process by not recording an image in the middle of editing as a log image.

Figure 12:
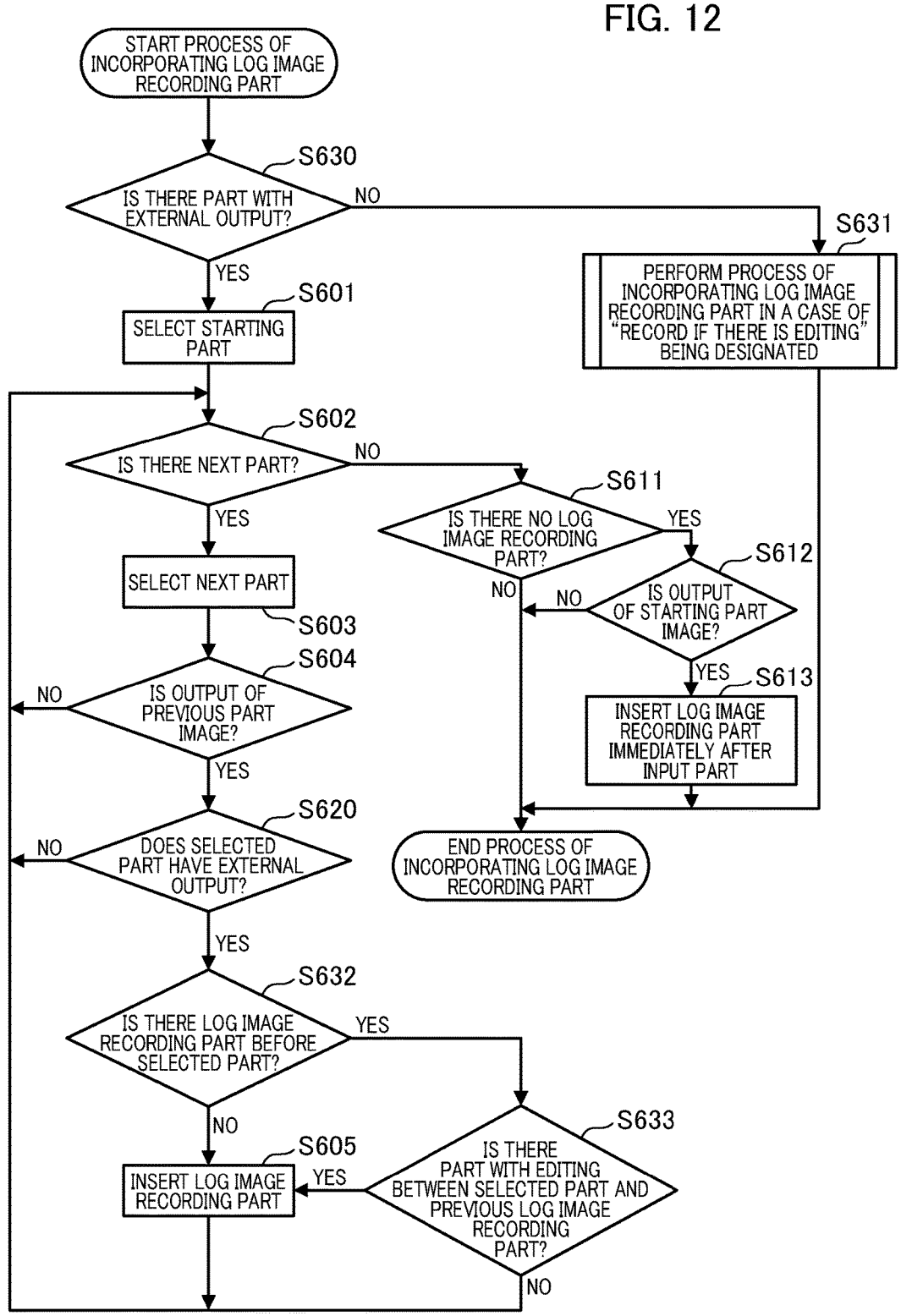
FIG. 12 is a flowchart which shows the process of incorporating a log image recording part when both "record if there is editing" and "record if there is an external output" are designated.

FIG. 12 is a flowchart of the process of incorporating a log image recording part in a case of both "record if there is editing" and "record if there is an external output" being designated as conditions for recording a log image. If both "record if there is editing" and "record if there is an external output" are designated, even though there are a plurality of times of external outputs, a log image is not recorded for each output, and is recorded in accordance with an editing state of an image. Each step shown in the flowchart of FIG. 12 is stored in the ROM 212 or the HDD 214 of the information processing apparatus 101, and executed by the CPU 211. In addition, the CPU 211 uses the RAM 213 or the HDD 214 as a storage area when necessary. The same steps as in FIG. 10 will be denoted by the same reference numerals as those in FIG. 10, the description thereof will be omitted, and only differences will be described.

In step S630, the incorporating unit 303 determines whether there is a part with an external output in a workflow to incorporate a log image recording part therein. If there is a part with an external output in a workflow to incorporate a log image recording part therein, the process proceeds to step S601. On the other hand, if there is no part with an external output in a workflow to incorporate a log image recording part therein, the process proceeds to step S631.

In step S631, the incorporating unit 303 executes the process of incorporating a log image recording part in a case of "record if there is editing" being designated as a condition for recording a log image, which is shown in FIG. 8.

In step S632, the incorporating unit 303 determines whether there is a log image recording part before the selected part. If there is a log image recording part before the selected part, the process proceeds to step S633. On the other hand, if there is no log image recording part before the selected part, the process proceeds to step S605, and the incorporating unit 303 inserts a log image recording part between the selected part and a part previous thereto. In step S605, a log image recording part is inserted before the selected part with an external output, but a log image recording part may also be inserted after the part with an external output such that a log image is recorded after the external output process is completed.

In step S633, the incorporating unit 303 determines whether there is a part with editing between a part with an external output which is the selected part and a log image recording part which is immediately previous to the selected part. If there is a part with editing between the selected part and the log image recording part which is immediately previous to the selected part, the process proceeds to step S605, and a log image recording part is inserted between the part with an external output which is the selected part and a part immediately previous thereto. On the other hand, if there is no part with editing between the selected part and the log image recording part which is immediately previous to the selected part, the process returns to step S602.

Figure 13A:
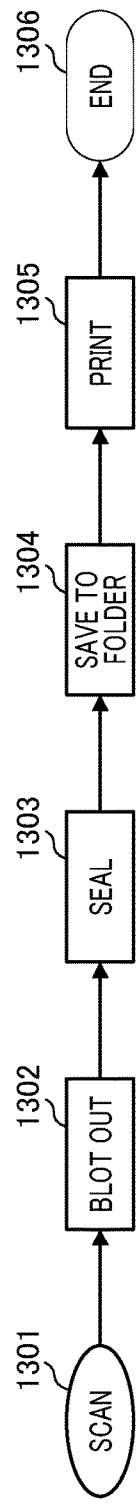
FIGS. 13A to 13D are diagrams which show examples of workflow.
Figure 13B:
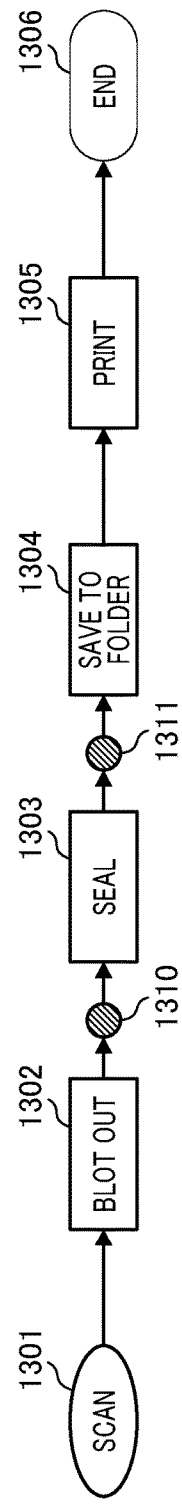

Using FIGS. 13A to 13D, a process in a case of both "record if there is editing" and "record if there is an external output" being designated as a condition for recording a log image, that is, a process based on the flowchart of FIG. 12, will be described in detail. FIG. 13A is a diagram which shows an example of a workflow before a log image recording part is inserted. FIG. 13B is a diagram which shows an example of a workflow after a log image recording part is inserted under a condition of "record if there is editing." FIG. 13C is a diagram which shows an example of the workflow after a log image recording part is inserted under a condition of "record if there is an external output." FIG. 13D is a diagram which shows an example of the workflow after a log image recording part is inserted if both "record if there is editing" and "record if there is an external output" are designated.

The workflow shown in FIG. 13A is a workflow to incorporate a log image recording part therein. Parts 1301 to 1306 are workflow parts, and the process is performed in order from the part 1301. Among the parts 1301 to 1306, a part with editing is a "blot out" part 1302 and a "seal" part 1303, and a part with an external output is a "save to folder" part 1304 and a "print" part 1305.

If "record if there is editing" is designated as a condition for recording a log image, a log image recording part 1310 and a log image recording part 1311 are inserted as shown in FIG. 13B in accordance with the flowchart of FIG. 8. However, a log image recorded by the log image recording part 1310 is an image in the middle of editing which is further edited by the subsequent part 1303, and is not output to the outside from the image forming apparatus 102. For this reason, this image in the middle of editing has a low need to be recorded as a log image.

Figure 13C:
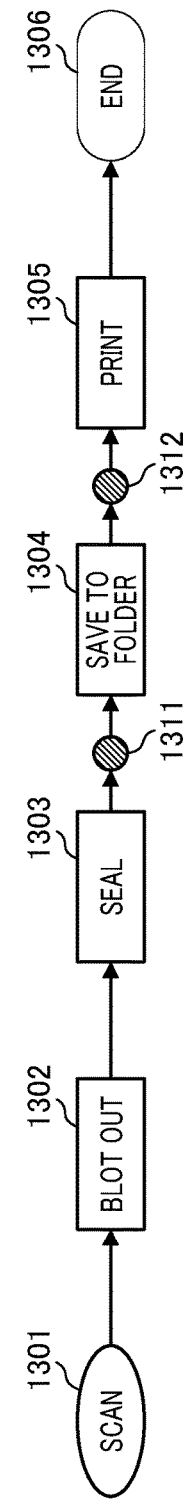
Figure 13D:
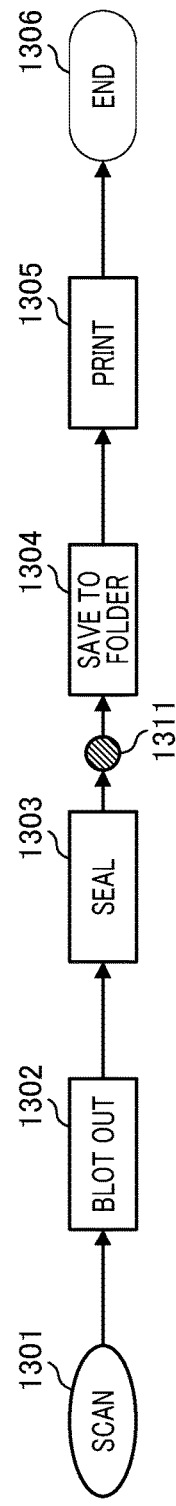

If "record if there is an external output" is designated as a condition for recording a log image, the log image recording part 1311 and a log image recording part 1312 are inserted as shown in FIG. 13C in accordance with the flowchart of FIG. 10. However, since editing is not performed by the part 1304, a log image recorded by the log image recording part 1311 and a log image recorded by the log image recording part 1312 are the same image. For this reason, the need to record the log image using the log image recording part 1312 is low and a log image recording capacity is uselessly increased.

On the other hand, a case in which both conditions of "record if there is editing" and "record if there is an external output" are designated will be described. In this case, the log image recording part 1311 is inserted between the "seal" part 1303 and the "save to folder" part 1304 as shown in FIG. 13D in accordance with the flowchart of FIG. 12. In FIG. 12, if a selected part is the "save to folder" part 1304 with an external output, the process proceeds to step S605 from step S632, and a process of inserting a log image recording part is performed. Accordingly, if there is no external output, it is possible to prevent an image in the middle of editing from being recorded as a log image, furthermore, to reduce a log image recording capacity, and to reduce the load of the process.

Figure 14:
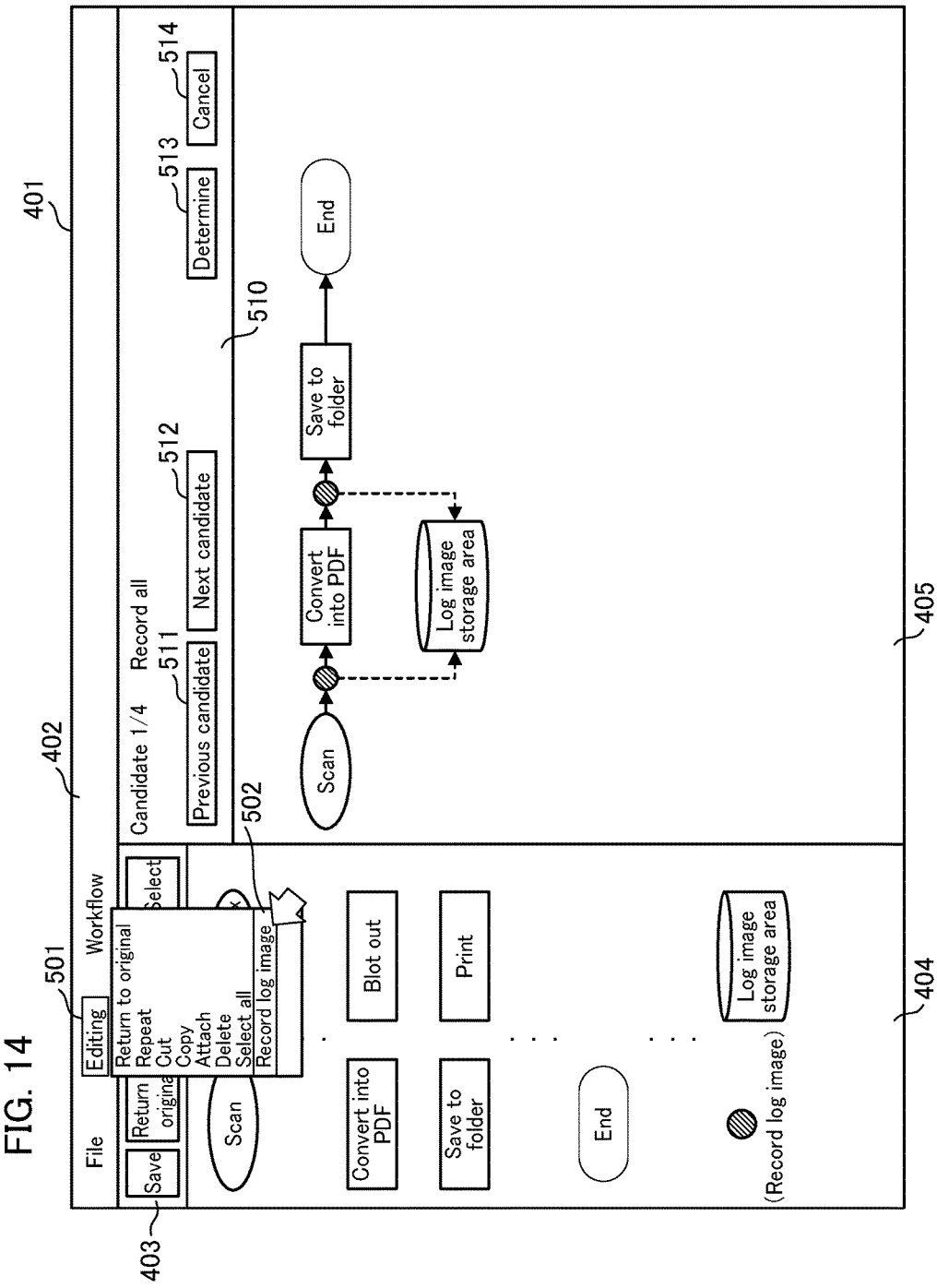
FIG. 14 is a diagram which shows an example of the screen of a workflow editor.

Next, an example of a screen which displays a workflow candidate created for each condition and allows a user to perform selection will be described using FIG. 14. FIG. 14 is a diagram which shows a screen example of a workflow editor of the present embodiment, which is executed on the information processing apparatus 101. An edit menu is displayed by pressing the edit button 501, and the log image recording menu 502 in the edit menu is selected. At this time, the dialog box 503 in FIG. 5 is displayed, and causes a user to designate a condition for recording a log image. In the example described in FIG. 14, the dialog box 503 is not displayed, and a workflow with each designated condition is caused to be displayed in order as a user selectable option.

If the log image recording menu 502 is selected, the UI unit 301 of a workflow editor displays a candidate selection operation area 510 and displays a workflow in a case of a condition of "record all" being designated in the editing area 405. The candidate selection operation area 510 displays a condition for inserting a log image recording part which is applied to a displayed candidate, a previous candidate display button 511, a next candidate display button 512, a determination button 513, and a cancel button 514.

The previous candidate display button 511 and the next candidate display button 512 are buttons for switching between candidates to be displayed, respectively. "Record all" is first applied as a condition applied to the candidates. Thereafter, switching is performed in order of "record if there is editing," "record if there is an external output," and both "record if there is editing" and "record if there is an external output" by repeatedly pressing the next candidate display button 512. On the other hand, if the previous candidate display button 511 is pressed, switching is set to be performed in the reverse order. The previous candidate display button 511 or the next candidate display button 512 is pressed and the candidates for workflow displayed in the editing area 405 are switched between in accordance with a change in applied conditions. Then, a user may select a desired workflow among the candidates and press the determination button 513. As a result, a user can select a desired workflow in which a log image recording part is inserted while viewing the displayed candidates for workflow without being conscious of the contents of the condition.

As described above, it is possible to present a workflow for recording necessary image data according to a condition at an appropriate timing to a user in the present embodiment. A user may adopt a presented workflow. In addition, if there are a plurality of insertion places for a log image recording part, a user may be caused to select an insertion place of a log image recording part by presenting these places to the user. Furthermore, even when a desired workflow is not presented, a user can perform editing on the basis of a presented workflow and flexibly change a recording timing. Accordingly, it is possible to reduce the burden of setting on a user and to improve the efficiency of the process, as compared to a case in which a user entirely initiatively performs the insertion of log image recording parts.

(Embodiment 2)

A searchable PDF in which results of an optical character recognition (OCR) process are embedded in a PDF has text data included in an image in addition to image data, and it is useful as a log image, and thus it is useful to record a searchable PDF. However, if a condition other than "record all" is selected in the embodiment 1, there is an image which is not recorded. Therefore, irrespective of which condition is selected in the present embodiment, a process of incorporating a log image recording part is performed to exceptionally record a searchable PDF. In the following, the description of parts duplicating those in the embodiment 1 will be omitted, and only differences will be described.

Figure 15:
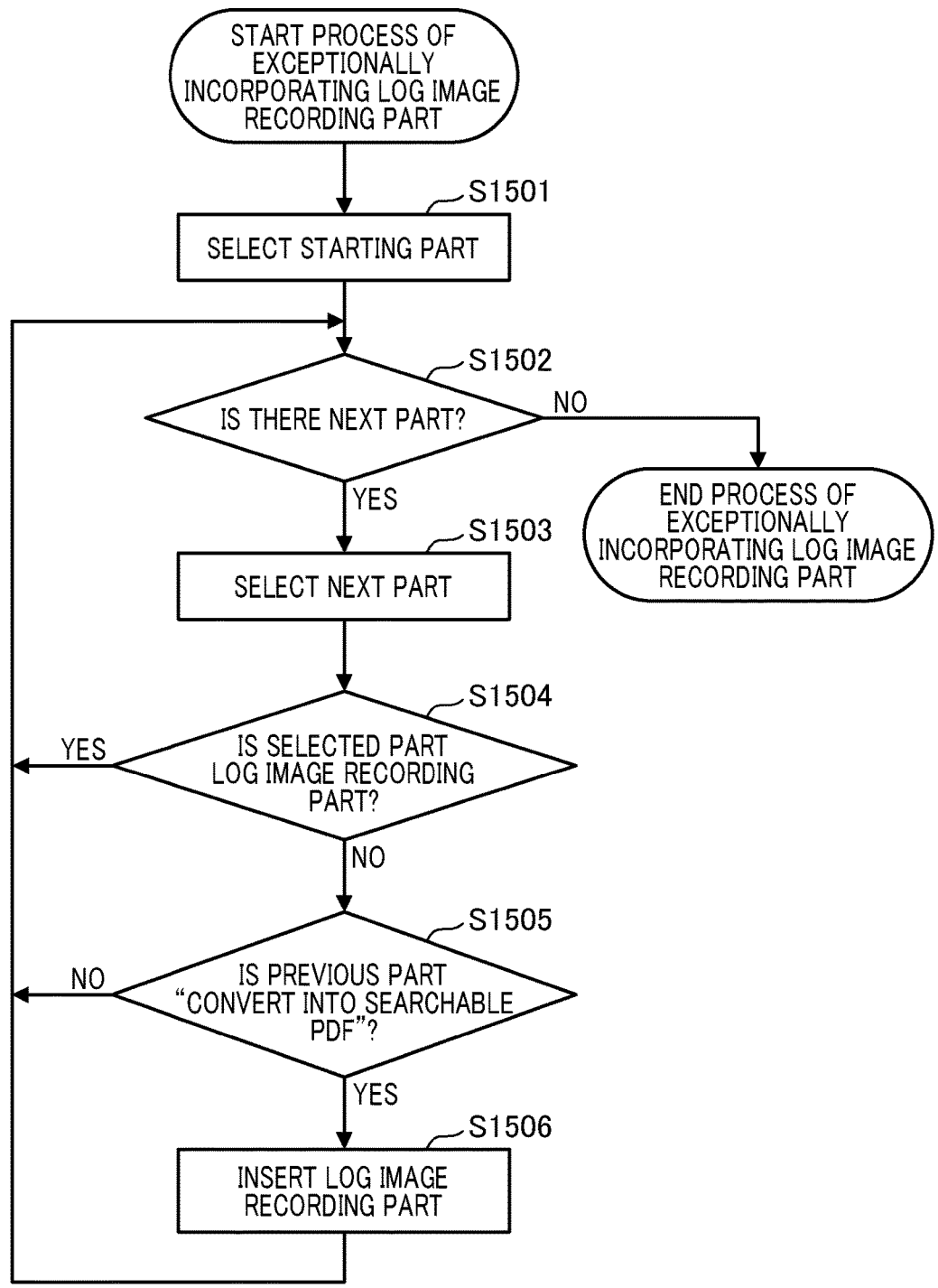
FIG. 15 is a flowchart which shows a process procedure for exceptionally incorporating a log image recording part.

FIG. 15 is a flowchart of a process of exceptionally incorporating a log image recording part if a searchable PDF is output. Each step shown in the flowchart of FIG. 15 is stored in the ROM 212 or the HDD 214 of the information processing apparatus 101, and is executed by the CPU 211. In addition, the CPU 211 uses the RAM 213 or the HDD 214 as a storage area when necessary. The process of exceptionally incorporating a log image recording part shown in FIG. 15 is executed after a normal process of incorporating a log image recording part described in the first embodiment is performed.

In step S1501, the incorporating unit 303 selects a starting part of a workflow to incorporate a log image recording process therein.

In step S1502, the incorporating unit 303 determines whether there is a part after the selected part. If there is a next part, the process proceeds to step S1503. On the other hand, if there is no next part, the process ends.

In step S1503, the incorporating unit 303 selects a part after the selected part.

In step S1504, the incorporating unit 303 determines whether a selected part is a log image recording part. If a selected part is a log image recording part, the process returns to step S1502. If a selected part is not a log image recording part, the process proceeds to step S1505.

In step S1505, the incorporating unit 303 determines whether a part previous to the selected part is a "convert into searchable PDF" part. Whether or not a previous part is a "convert into searchable PDF" part may be determined by the part itself, and can be determined by whether or not the output details of the information of the part is "searchable PDF". If a previous part is the "convert into searchable PDF" part, the process proceeds to step S1506. On the other hand, if a previous part is not the "convert into searchable PDF" part, the process returns to step S1502. In the present embodiment, information on whether there is a searchable PDF or not is included in the output details, but the present embodiment is not limited thereto. For example, information on whether to exceptionally record a log image may also be included in an information item of a part.

In step S1506, the incorporating unit 303 inserts a log image recording part between the selected part and a part previous thereto (that is, the "convert into searchable PDF" part), and returns the process to step S1502.

Using FIGS. 16A to 16C, a process of exceptionally incorporating a log image recording part if a searchable PDF is output, that is, a process based on the flowchart of FIG. 15, will be described in detail. FIG. 16A is a diagram which shows an example of a workflow before a log image recording part is inserted. FIG. 16B is a diagram which shows an example of a workflow after a log image recording part is inserted if both conditions of "record if there is editing" and "record if there is an external output" are designated. FIG. 16C, after FIG. 16B, is a diagram which shows an example of a workflow in a case of a process of exceptionally incorporating a log image recording part being performed if a searchable PDF is output.

The workflow shown in FIG. 16A is a workflow to incorporate a log image recording part therein. Parts 1601 to 1606 are workflow parts, and the process is performed in order from the part 1601. Among the parts 1601 to 1606, a part with editing is a "blot out" part 1602, and a part with an external output is a "print" part 1603 and a "save to folder" part 1605. Further, a part for outputting a searchable PDF is a "convert into searchable PDF" part 1604.

If conditions of both "record if there is editing" and "record if there is an external output" are designated as conditions for recording a log image, a log image recording part 1610 is inserted as shown in FIG. 16B in accordance with the flowchart of FIG. 12. Here, a log image recording part 1611 for recording a searchable PDF as a log image after the "convert into searchable PDF" part 1604 is inserted as shown in FIG. 16C by further performing the process of the flowchart of FIG. 15.

Although a searchable PDF is described as an example of a useful image as a log image, the present embodiment is not limited thereto, and a log image may exceptionally be recorded by any means in the same flow as in FIG. 15 according to a specific data format useful as a log image. As described above, it is possible to incorporate a log image recording part to record an image which is not recorded under the conditions of the embodiment 1 but is a useful image as a log image by any means in the present embodiment.

(Embodiment 3)

If an OCR process with respect to an image in the middle of a workflow is performed, recording text of results of the process in association with a log image is useful at the time of auditing a log image at a later time. Therefore, in the present embodiment, if there is an OCR process in the middle of a workflow, a process of incorporating a text recording part for recording a text of a result of the OCR process is performed. The description of parts overlapping those in the embodiment 1 will be omitted, and only differences will be described.

Figure 17:
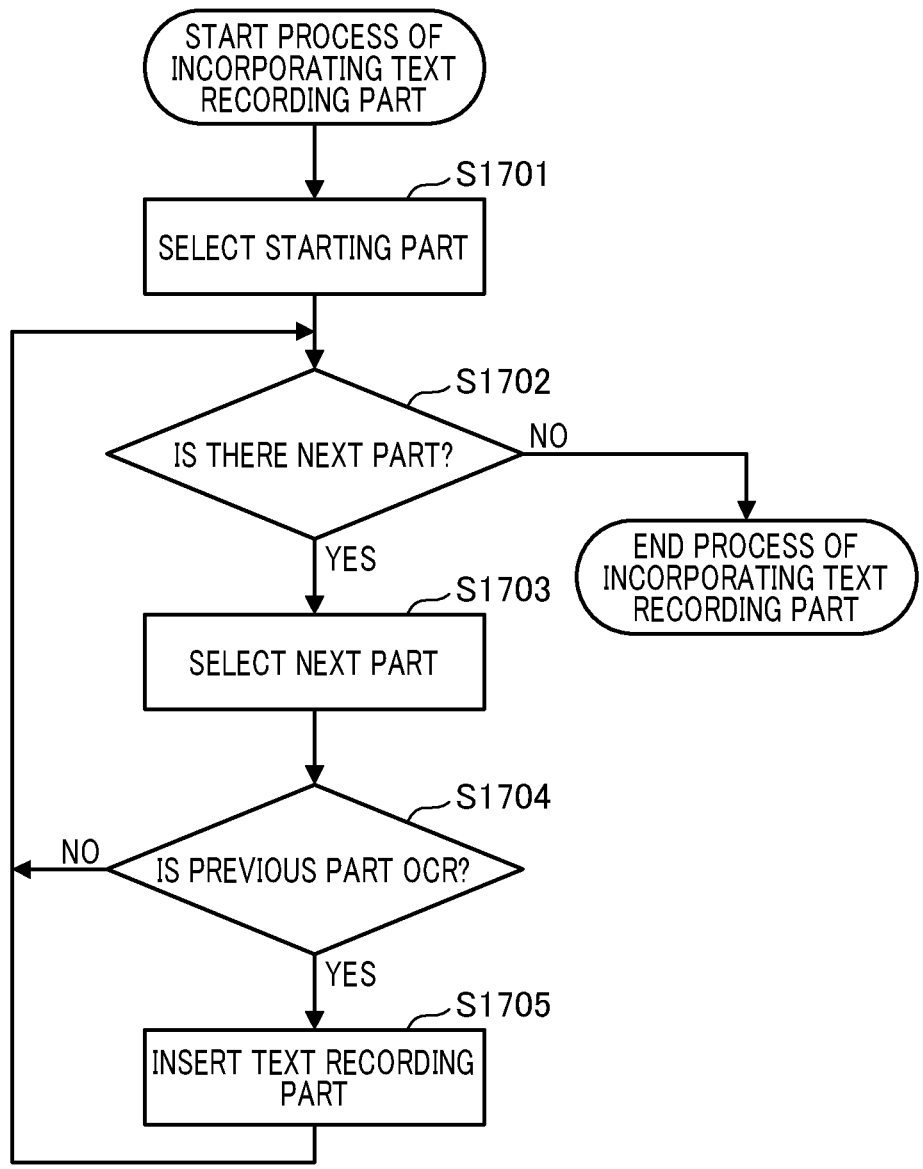
FIG. 17 is a flowchart which shows a process procedure for exceptionally incorporating a text recording part.

FIG. 17 is a flowchart of the process of incorporating a text recording part when there is a "OCR" part performing a process of optical character recognition (OCR). Each step shown in the flowchart of FIG. 17 is stored in the ROM 212 or the HDD 214 of the information processing apparatus 101, and is executed by the CPU 211. In addition, the CPU 211 uses the RAM 213 or the HDD 214 as a storage area when necessary. The process of incorporating a text recording part shown in FIG. 17 is executed after the normal process of incorporating a log image recording part described in the embodiment 1 is performed.

In step S1701, the incorporating unit 303 selects a starting part of a workflow to incorporate a text recording process therein.

In step S1702, the incorporating unit 303 determines whether there is a part corresponding to a process after the selected part. If there is a next part, the process proceeds to step S1703. On the other hand, if there is no next part, the process ends.

In step S1703, the incorporating unit 303 selects a part corresponding to the process after the selected part.

In step S1704, the incorporating unit 303 determines whether a part previous to the selected part is an "OCR" part. If a previous part is an "OCR" part, the process proceeds to step S1705. On the other hand, if a previous part is not an "OCR" part, the process returns to step S1702.

In step S1705, the incorporating unit 303 inserts a text recording part between the selected part and the previous part thereto (that is, the "OCR" part), and returns the process to step S1702.

Figure 18A:
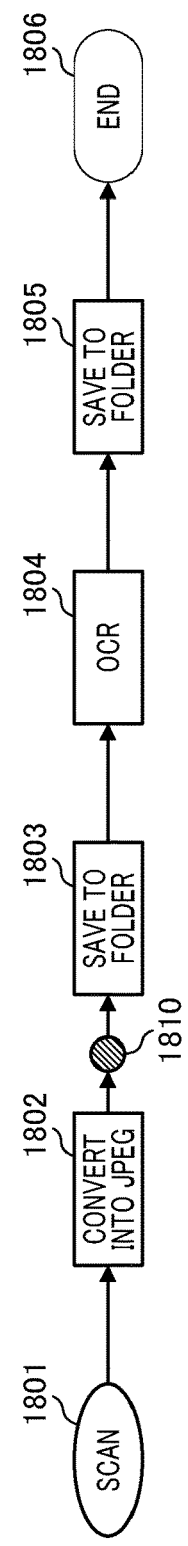
FIGS. 18A and 18B are diagrams which show examples of workflow.
Figure 18B:
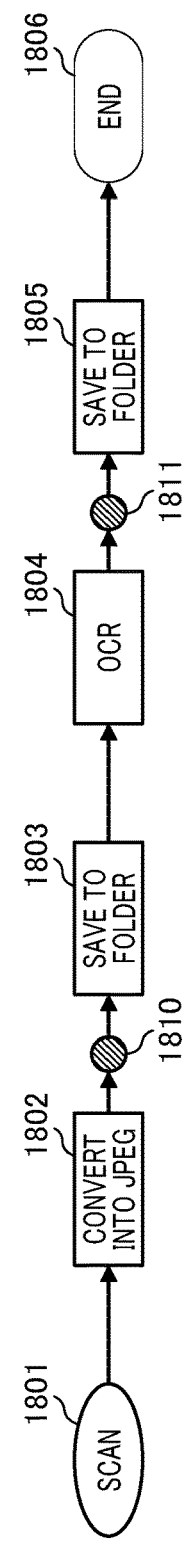

The process of incorporating a text recording part if there is a "OCR" part, that is, a process based on the flowchart of FIG. 17, will be described in detail with reference to FIGS. 18A and 18B. FIG. 18A is a diagram which shows an example of a workflow after a log image recording part is inserted under a condition of "record if there is an external output". Parts 1801 to 1806 are workflow parts, and the process is performed in order from the part 1801. An OCR part which outputs a text by performing an OCR on an image input among the parts 1801 to 1806 is the "OCR" part 1804. Whether or not a part performs an OCR process may be determined by allowing a part to have information to distinguish whether the part is an OCR part, or may also be determined by determining that a part with an input format of image and an output format of text is a part performing an OCR process.

A log image recording part 1810 is inserted in a workflow to incorporate a log image recording part therein constituted by the parts 1801 to 1806 in FIG. 18A. With respect to a flowchart shown in FIG. 18A, a text recording part 1811 for recording a text output by the "OCR" part 1804 is inserted by performing the process of incorporating a text recording part in accordance with the flowchart of FIG. 17. FIG. 18B is a diagram which shows an example of a workflow after a text recording part is inserted.

At the time of saving a text by a text recording part, a text may be saved as a single piece of text, and may also be saved in association with a log image saved immediately before the text saving or a log image saved immediately after the text saving. It becomes easy to search and monitor the content of a log image by saving a text in association with a log image. In the present embodiment, text data obtained by the OCR process has been described as an example of data useful to be recorded in association with a log image, but the present invention is not limited thereto. If there is useful data to be recorded in association with a log image, it may be recorded in the same flow as in FIG. 17.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-125573, filed Jun. 27, 2017, which is hereby incorporated by reference wherein in its entirety.

What is claimed is:

1. A workflow generation apparatus comprising:
a processor; and
a memory that stores instructions,
wherein the processor executes the instructions to perform:
displaying a plurality of parts connected with arrows on a screen for editing a workflow, wherein the displayed plurality of parts represent a plurality of processes to be executed in the workflow, wherein the arrows represents an order in which the plurality of processes are executed in the workflow, and wherein the workflow is edited on the screen by disposing the plurality of parts and connecting the parts with the arrows on the basis of an instruction of a user;
designating a condition to be used for determining an insertion position of a log recording part;
determining, based on the designated condition, the insertion position of the log recoding part from among the plurality of parts displayed on the screen; and
inserting, on the screen, the log recording part at the insertion position determined from among the displayed plurality of parts, wherein the log recording part represents a log recording process that is a process for recording, as a log, data to be processed during executing the workflow.

2. The workflow generation apparatus according to claim 1,
wherein, if the designated condition is a condition for recording data in a case of performing editing of the data, the processor determines, as the insertion position of the log recording part, a position after a part corresponding to an editing process of editing data from among the displayed plurality of parts.

3. The workflow generation apparatus according to claim 1,
wherein, if the designated condition is a condition to record data in a case of outputting the data to the outside, the processor determines, as the insertion position of the log recording part, a position before a part corresponding to an output process of outputting data to the outside from among the displayed plurality of parts.

4. The workflow generation apparatus according to claim 1,
wherein, if the designated condition is a condition to record data in a case of outputting the data to the outside, the processor determines, as the insertion position of the log recording part, a position after a part corresponding to the output process of outputting data to the outside from among the displayed plurality of parts.

5. The workflow generation apparatus according to claim 1,
wherein, if the designated condition is a condition to record data in a case of editing data and outputting the data to the outside, the processor determines, as the insertion position of the log recording part, a position between parts corresponding to an editing process of editing the data and an output process of outputting the data to the outside.

6. The workflow generation apparatus according to claim 5,
wherein, if the designated condition is a condition to record data in a case of editing data and outputting the data to the outside, the processor determines whether there is an editing process of editing the data after another log recording process which is already incorporated in the workflow, and determines, as the insertion position of the log recording part, a position between parts corresponding to an editing process of editing the data and an output process of outputting the data to the outside if it is determined that there is an editing process.

7. The workflow generation apparatus according to claim 1,
wherein, if the designated condition is a condition to record data in a case of editing data and outputting the data to the outside, the processor determines, as the insertion position of the log recording part, a position after an output process of outputting the data to the outside, and
wherein, if another log recording process is already incorporated in the workflow before the output process, the processor determines whether there is an editing process between the another log recording process and the output process, and determines, as the insertion position of the log recording part, a position after the output process of outputting data to the outside if it is determined that there is an editing process.

8. The workflow generation apparatus according to claim 1,
wherein, if the designated condition is a condition to record a log in a case of outputting a specific data format, the processor determines, as the insertion position of the log recording part, a position after a process of outputting the specific data format.

9. The workflow generation apparatus according to claim 8, wherein the specific data format is a searchable PDF.

10. The workflow generation apparatus according to claim 1, wherein, if there is an OCR process of outputting text data which is a result of an OCR operation in the workflow, the processor further inserts, at a position after the OCR process, a log recording part that records the text data as a log.

11. The workflow generation apparatus according to claim 1, wherein the processor further displays a dialog box for causing a user to select the designated condition.

12. The workflow generation apparatus according to claim 1, wherein the processor creates a plurality of workflows by setting each of a plurality of conditions as the designated condition and by determining insertion position of the log recoding part based on each set condition and by inserting the log recording part at the determined insertion position, after and wherein the processor displays the plurality of workflows as options which can be selected by a user.

13. A workflow generation method comprising:
displaying a plurality of parts connected with arrows on a screen for editing a workflow, wherein the displayed plurality of parts represent a plurality of processes to be executed in the workflow, wherein the arrows represents an order in which the plurality of processes are executed in the workflow, and wherein the workflow is edited on the screen by disposing the plurality of parts and connecting the parts with the arrows on the basis of an instruction of a user;
designating a condition to be used for determining an insertion position of a log recording part;
determining, based on the designated condition, the insertion position of the log recoding part from among the plurality of parts displayed on the screen; and
inserting, on the screen, the log recording part at the insertion position determined from among the displayed plurality of parts, wherein the log recording part represents a log recording process that is a process for recording, as a log, data to be processed during executing the workflow.

14. A non-transitory storage medium on which is stored a computer program for making a computer perform:
displaying a plurality of parts connected with arrows on a screen for editing a workflow, wherein the displayed plurality of parts represent a plurality of processes to be executed in the workflow, wherein the arrows represents an order in which the plurality of processes are executed in the workflow, and wherein the workflow is edited on the screen by disposing the plurality of parts and connecting the parts with the arrows on the basis of an instruction of a user;
designating a condition to be used for determining an insertion position of a log recording part;
determining, based on the designated condition, the insertion position of the log recoding part from among the plurality of parts displayed on the screen; and
inserting, on the screen, the log recording part at the insertion position determined from among the displayed plurality of parts, wherein the log recording part represents a log recording process that is a process for recording, as a log, data to be processed during executing the workflow.

* * * * *